United States Patent
Stojanovski

[11] Patent Number: 5,468,102
[45] Date of Patent: Nov. 21, 1995

[54] MILLING TOOL HOLDER

[76] Inventor: Stojan Stojanovski, 1950 Birchwood, Troy, Mich. 48084

[21] Appl. No.: 300,376

[22] Filed: Sep. 2, 1994

[51] Int. Cl.[6] ............................... B23C 5/26; B23B 31/00
[52] U.S. Cl. ......................... 409/234; 279/83; 408/239 R
[58] Field of Search ..................................... 409/232, 234, 409/233, 231; 408/238, 239 R, 713, 226; 82/160; 279/83, 97

[56] References Cited

U.S. PATENT DOCUMENTS

| 2,217,656 | 10/1940 | Boehme | 308/197 |
|---|---|---|---|
| 3,022,084 | 2/1962 | Dresback | 279/83 |
| 3,202,433 | 8/1965 | Davis | 279/9 |
| 3,884,120 | 5/1975 | Diferdinando | 409/234 |
| 4,006,996 | 2/1977 | Kasabian | 408/226 |
| 4,063,343 | 12/1977 | Barkley et al. | 408/146 |
| 4,116,573 | 9/1978 | Fuchs | 403/264 |
| 4,509,887 | 4/1985 | Hofling | 408/239 R |
| 4,575,292 | 3/1986 | Pape et al. | 409/234 |
| 4,647,052 | 3/1987 | Butikofer | 279/83 |
| 4,655,655 | 4/1987 | Schurfeld | 409/232 |
| 4,718,799 | 1/1988 | Hubscher | 409/234 |
| 4,767,246 | 8/1988 | Camloh et al. | 409/234 |
| 4,822,220 | 4/1989 | Danielsson et al. | 409/231 |
| 4,913,607 | 4/1990 | von Haas | 409/234 |
| 5,052,864 | 10/1991 | Shaw | 408/713 X |
| 5,110,240 | 5/1992 | Zeilinger | 409/234 |

FOREIGN PATENT DOCUMENTS

| 2455498 | 11/1980 | France | 279/83 |
|---|---|---|---|
| 2727838 | 12/1977 | Germany | 408/239 |

Primary Examiner—William Briggs
Attorney, Agent, or Firm—Charles W. Chandler

[57] ABSTRACT

A milling tool holder comprising an elongated body adapted to be supported on a milling tool base. The body has a shank receiving bore opening in one end of the body. A head supports a pair of indexable inserts and has a shank received in the shank-receiving opening. The end of the shank has a slot which mates with a key in the shank-receiving bore to prevent the head from rotating with respect to the tool body. A pair of fasteners lock the shank to the body.

4 Claims, 2 Drawing Sheets

MILLING TOOL HOLDER

BACKGROUND OF THE INVENTION

This invention is related to a two-part milling tool holder which includes a body adapted to be mounted on a milling tool base. A replaceable head for supporting a pair of indexable inserts has a shank received in an opening in the body. The end of the shank engages a key in the shank-receiving opening when the head is seated on the body. The head can be replaced with another head of the same or a different style.

Milling tool inserts are commonly mounted on the end of an elongated tool holder. It is desirable in some cutting situations, to use one type of insert for heavy milling, and then another insert for cutting a radius or the like. Occasionally, the cutter head becomes damaged or worn. Commercially-available heads generally must either be scrapped or repaired. Most of the expense in making the holder is in the body of the holder. Further, replacing a complete tool holder is time consuming.

Prior art related to tool holders such as for milling inserts may be found in U.S. Pat. Nos. 2,21 7,656 which was issued Oct. 15, 1940 to Paul C. Boehme for "Adjustable Collar"; 3,202,433 which was issued Aug. 24, 1965 to Arthur G. Davis for "Adapter With Adjustment for Setting Cutters"; 4,063,843 which was issued Dec. 20, 1977 to George G. Barkley et al for "Adjustable Boring Bar"; 4,116,573 which was issued Sep. 26, 1978 to Lothar U. Fuchs for "Fastening"; 4,647,052 which was issued Mar. 3, 1987 to Willy Butikofer for "Tool-Holding Device and Tool Support"; 4,655,655 which was issued Apr. 7, 1987 to Horst Schurfeld for "Tool and Workpiece Holding Arrangement for Material Removing Machining"; and 4,822,220 which was issued Apr. 18, 1989 to Sven-Arne Danielsson et al for "Device for Securing Tools in Metal Working Machine".

SUMMARY OF THE INVENTION

The broad purpose of the present invention is to provide an improved milling tool holder of the type in which a body adapted to be supported on a milling machine base, is connected to a head that supports a pair of indexable utility inserts. The head has a shank received in a bore in the body. The end of the shank has a slot that mates with a pin-shaped key in the bore in the body. The key is transverse to the length of the shank. The outer end of the shank has an annular shoulder that seats on a shoulder defining the bore opening. A pair of threaded fasteners mounted on the body have their inner ends engaging the shank to cam the shoulder on the head toward the shoulder on the body.

The arrangement is such that the user can readily exchange the head whenever it has become damaged, worn, or needs to be exchanged to accommodate a head having a different cutting configuration.

Still further objects and advantages of the invention will become readily apparent to those skilled in the art to which the invention pertains upon reference to the following detailed description of the drawings.

DESCRIPTION OF THE DRAWINGS

The description refers to the accompanying drawings in which like reference characters refer to like parts throughout the several views, and in which.

DESCRIPTION OF A PREFERRED EMBODIMENT

Figure 1:
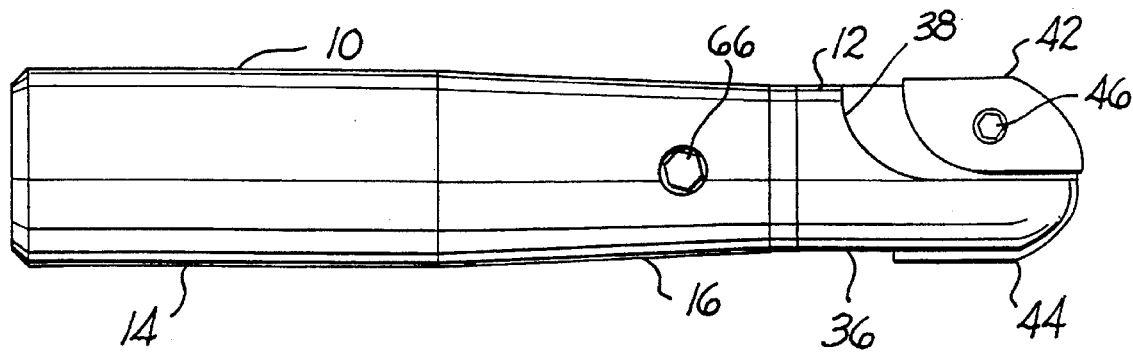
FIG. 1 is a longitudinal view of a milling tool holder illustrating the preferred embodiment of the invention.

Referring to the drawings, a preferred tool holder comprises an elongated steel body 10 and an elongated steel head 12. The body is adapted to be mounted in the conventional manner on a milling machine base. Body 10 has a generally cylindrical inner end 14 and a generally tapered outer end 16. The body has an outer annular shoulder 18 formed around the opening of an internal bore 20. Bore 20 has a cylindrical inner surface formed about a longitudinal axis 22 which also corresponds with the longitudinal axis of body 10 and head 12.

For illustrative purposes, bore 20 has a depth of about 2", slightly less than one-half the overall length of body 10, which has a length of about 4¼". Bore 20 has a diameter of about 9/16".

A steel pin functions as a key 24. Key 24 has a length corresponding to the thickness of body 10 and for illustrative purposes, has a diameter of 3/16". Key 24 is permanently driven into an opening 26 in the body. Opening 26 is formed along an axis that is transverse and intersects longitudinal axis 22. The key is spaced from the bottom of the bore.

Figure 4:
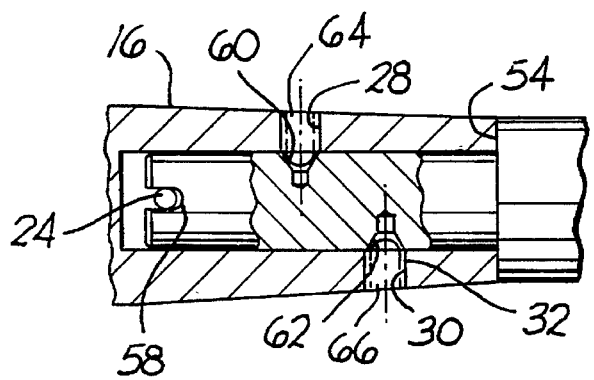
FIG. 4 is a view similar to FIG. 3, but in which the body has been rotated 90 degrees and the shank is shown partially in section.

The body also has a pair of fastener-receiving openings 28 and 30. The two openings are each formed about parallel axis, and each disposed at right angles to and intersecting longitudinal axis 22. Openings 28 and 30 are longitudinally spaced about 5/8". The axis of threaded opening 28 is spaced about 3/4" from the axis of key 24, as best illustrated in FIG. 4, and rotated 90° with respect to the axis of the key.

Figure 2:
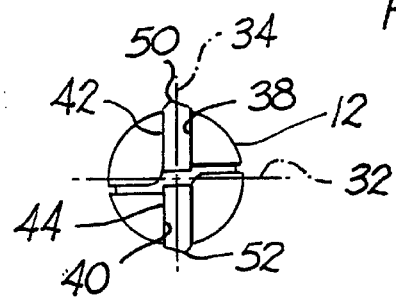
FIG. 2 is an end view as seen from the right side of FIG. 1.
Figure 3:
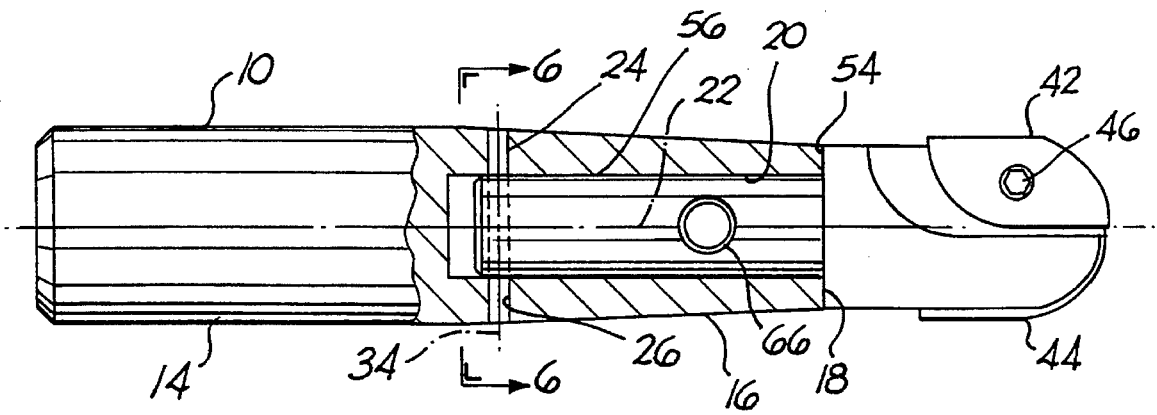
FIG. 3 is a view similar to FIG. 1, but in which the body is partially shown in section.

For illustrative purposes, referring to FIG. 2, opening 30 is formed along an axis 32 while the key opening is formed about an axis 34 which is at right angles to axis 32.

Head 12 has an enlarged outer end 36 formed with a pair of slots 38 and 40 for mounting indexable inserts 42 and 44. Each insert is releasably fastened to the head by a fastener means 46. The inserts are relatively flat, with cutting edges 50 and 52, respectively. The axis' of fastener receiving openings 28 and 30 are disposed perpendicular to the plane of the inserts.

Head 12 has an annular seat 54, and an elongated cylindrical shank 56, received in bore 20. Shank 56 has a length less than the depth of bore 20, and a diameter forming a snug sliding fit in the bore.

Figure 6:
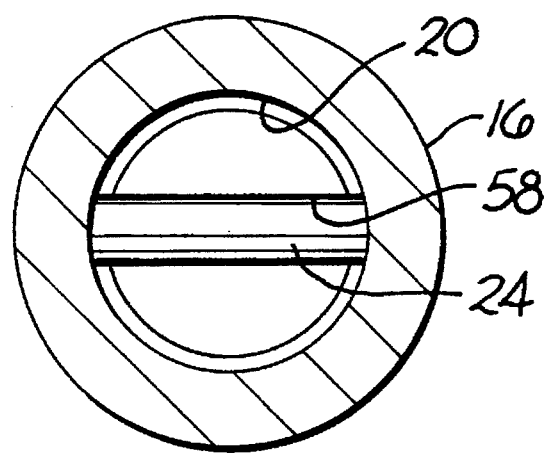
FIG. 6 is an enlarged view as seen along lines 6—6 of FIG. 3.

Referring to FIGS. 4 and 6, the inner end of the shank has a slot 58 for receiving key 24. The slot is transverse to the longitudinal axis of the shank, has a depth greater than the diameter of key 24, and a width closely corresponding to the diameter of key 24. The shank is inserted into the bore until shoulder 18 of the body abuts shoulder 54 of the head, at which time slot 58 receives key 24. Key 24 closely mates with the slot, preventing any longitudinal rotation of the head with respect to the body.

The shank has a pair of counter-drilled openings or recesses 60 and 62 which are slightly offset from fastener receiving openings 28 and 30, respectively, when the shank has been fully received in bore 20. A threaded socket head fastener 64 is threadably received in opening 28, and a second threaded socket head fastener 66 is threadably received in fastener opening 30.

Figure 5:
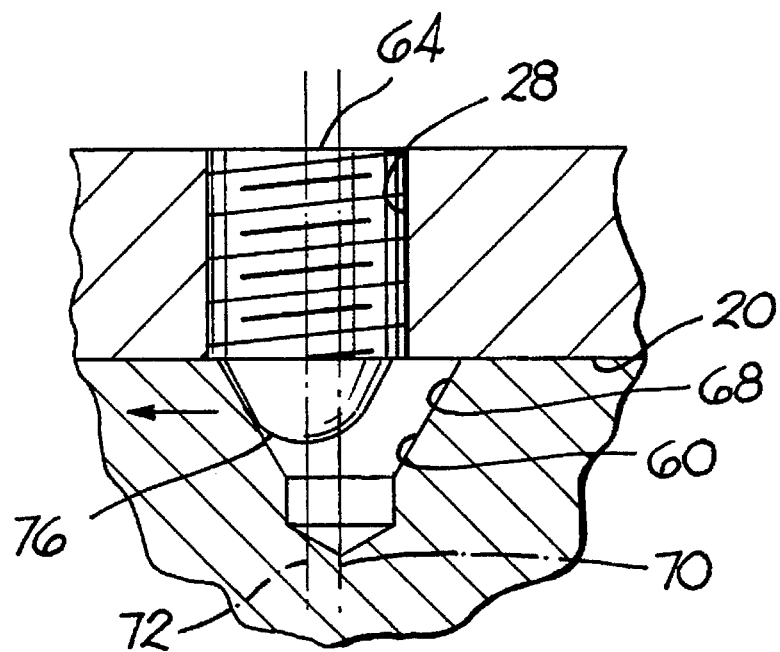
FIG. 5 is an enlarged view showing the manner in which the fasteners cam the shank toward its fully-seated position.

The two counter-drilled openings are identical except with respect to their location along the shank. Openings 28 and 30 are located on opposite sides of the shank, and the axis of each counter-drilled opening is at right angles to the axis of key 24. A typical counter-drilled opening and its fastener is illustrated in FIG. 5. Counter-drilled opening 60 has a concave, frusto-conical surface 68 adjacent the inner end of fastener opening 28. The axis of counter-drilled hole 70 is offset from axis 72 of fastener-receiving opening 28. This distance is somewhat exaggerated in FIG. 5 to show that the axis of each counter-drilled opening is closer to shoulder 18 of the body than the axis of the corresponding fastener receiving opening.

Fastener 64 has a rounded inner end 76 that slideably engages frustoconical surface 68. The arrangement is such that as fastener 64 is threadably inserted into opening 28, inner end 76 engages surface 68 to cam the shank toward the bottom end of the bore, thereby causing shoulder 54 to tightly abut shoulder 18.

Similarly, the rounded inner end of fastener 66 slideably engages the frustoconical surface of counter drilled opening 62 to cam the shawl toward the bottom end of the bore.

The diameter of the shank very snugly fits the internal surface of bore 20, and shoulder 54 tightly abuts shoulder 18 in order to locate the inserts in a proper cutting position when the head is replaced with a different pair of inserts.

To assemble the tool holder, the inserts are mounted in the usual manner on the outer end of the head. The shank is inserted in bore 20 until slot 58 is aligned with and receives key 24.

Threaded fasteners 64 and 66 are then screwed into their respective counter-drilled openings to cam the shank until shoulder 54 abuts shoulder 18.

The process is reversed, to remove the head.

Having described my invention, I claim:

1. A tool holder assembly comprising:

an elongated tool holder body (10) having a longitudinal axis, an end surface (18), and an elongated shank-receiving bore (20) extending from said end surface along said longitudinal axis;

a tool holder head (12) adapted to support at least one cutting insert; said tool header head comprising a cylindrical shank (56) slidably receivable in said shank-receiving bore, and an annular seat (54) axially alignable with said end surface;

means (24, 58) for preventing relative rotation between said tool holder head and said tool holder body when said shank is slidably inserted into the bore;

means for biasing said tool holder head along said longitudinal axis so that said annular seat has pressure engagement with said end surface on the tool holder body;

said biasing means comprising two threaded openings (28, 30) in said tool holder body extending normal to said longitudinal axis in a common plane containing said longitudinal axis; said threaded openings being spaced about one hundred eighty degrees apart in the circumferential direction, said threaded openings also being spaced in the axial direction so that said openings communicate with said bore at axially spaced points therealong;

said shank having two frusto-conical recesses (60, 62) adapted to register with said threaded openings when said shank is inserted into said bore;

a threaded fastener (64, 66) threaded into each of said threaded openings to penetrate a respective frusto-conical recess, whereby said tool holder head is biased along said longitudinal axis.

2. The tool holder assembly of claim 1, wherein each of said threaded fasteners has a rounded spherical tip engageable with the surface of the respective frusto-conical recess.

3. The tool holder assembly of claim 1, wherein said rotation-preventing means comprises a slot (58) in said shank, and a pin (24) extending through said tool holder body normal to said longitudinal axis, so that when said shank is inserted into said bore, said slot receives said pin to prevent relative rotation between said tool holder head and said tool holder body.

4. The tool holder assembly of claim 3, wherein said tool holder head comprises two cutting insert support surfaces (38, 40) located in a plane normal to the aforementioned plane containing said threaded openings, said pin being coplanar with said cutting insert support surfaces.

\* \* \* \* \*